United States Patent [19]

Jelley et al.

[11] Patent Number: 5,594,560
[45] Date of Patent: Jan. 14, 1997

[54] DISPLAY DEVICE COMPRISING FLUORESCENT ENHANCED REFLECTIVE HOLOGRAPHIC ILLUMINATION

[75] Inventors: Kevin W. Jelley, LaGrange Park; George T. Valliath, Buffalo Grove; Alan G. Chen, Schaumburg, all of Ill.

[73] Assignee: Motorola, Inc., Schaumburg, Ill.

[21] Appl. No.: 206,360

[22] Filed: Mar. 7, 1994

[51] Int. Cl.$^6$ ............................ G02B 5/32; G02F 1/1335
[52] U.S. Cl. .............................. 359/15; 359/19; 349/70; 349/112; 349/113
[58] Field of Search .................. 359/15, 19, 13, 359/69, 70, 50; 385/12

[56] References Cited

U.S. PATENT DOCUMENTS

| | | | |
|---|---|---|---|
| 4,416,515 | 11/1983 | Funada et al. | 359/69 |
| 4,978,183 | 12/1990 | Vick | 359/15 |
| 4,984,872 | 1/1991 | Vick | 359/15 |
| 4,989,956 | 2/1991 | Wu et al. | 359/50 |
| 5,198,912 | 3/1993 | Ingwall et al. | 359/3 |
| 5,280,548 | 1/1994 | Atwater et al | 385/12 |

OTHER PUBLICATIONS

Magarinos, et al., *Engineering*, "Holographic Mirrors," vol. 24, No. 5, Sep./Oct. 1985, pp. 769–780.
Ingwall et al., *SPIE*, "Hologram Recording With a New Polaroid Photopolymer System," vol. 523, (1985), pp. 306–312.
Ingwall et al., *SPIE*, "The Mechanism of Hologram Formation in DMP–128 Photopolymer," vol. 883, (1988), pp. 102–105.

Ingram et al., *SPIE*, "Hologram Liquid Crystal Composites," vol. 1555, (1991), pp. 279–290.

Tedesco et al., "Holographic Diffusers for LCD Backlights and Projection Screens" Kaiser Optical Systems, Inc. Ann Arbor, MI. *1993 SID International Symposium Digest of Technical Papers*, May 1993, pp. 29–32.

*Primary Examiner*—Paul M. Dzierzynski
*Assistant Examiner*—Audrey Chang
*Attorney, Agent, or Firm*—Douglas D. Fekete

[57] ABSTRACT

A display device (10) includes a display panel, such as a liquid crystal panel (12), in combination with a reflective holographic optical element (14) that redirects ambient light for illuminating the display. The light redirected by the holographic element is limited to a predetermined spectral band. Fluorescent film (16) is included for absorbing light outside the spectral band of the holographic element and re-emitting light within the spectral band to increase the light redirected by the holographic element and thus increase the apparent brightness of the display.

5 Claims, 1 Drawing Sheet

DISPLAY DEVICE COMPRISING FLUORESCENT ENHANCED REFLECTIVE HOLOGRAPHIC ILLUMINATION

BACKGROUND OF THE INVENTION

This invention relates to a display device, such as a liquid crystal display device or the like, that comprises a reflective holographic optical element for ambient light illumination. More particularly, this invention relates to such display device that also includes a fluorescent element to increase the light redirected by the reflective holographic optical element and thereby enhance the brightness of the display.

A simple display combines dark and bright areas to create a desired image. For example, the dark areas may form alphanumeric characters surrounded by bright areas. The common example is produced by a liquid crystal display device and is found in calculators, watches, laptop computers and the like. The device comprises a liquid crystal panel that contains a layer of liquid crystal material sandwiched between front and back polarizers having perpendicular axis of polarization. Electrodes adjacent to the liquid crystal layer apply a localized electric field to selected regions of the layer. In the absence of an electric field, polarized light is admitted through one polarizer, reoriented by the liquid crystal layer and passes through the opposite polarizer, so that the panel appears transparent. However, an electric field disrupts the liquid crystal material to prevent light from being reoriented to pass through the opposite polarizer, resulting in an opaque region. By selectively applying electric voltage to the electrodes, individual regions of the panel are switched between a transparent state and an opaque state to create a desired display.

The liquid crystal panel does not generate the light needed for viewing the display. For this purpose, it is known to combine the liquid crystal panel with a reflector facing the back of the panel. Ambient light passing through a transparent region of the liquid crystal panel is reflected and is retransmitted through the liquid crystal panel to form a bright area for the display. Of course, light is not reflected through an opaque region.

It has been proposed to provide ambient light illumination of a display by a reflective holographic optical element, also referred to as a holographic reflector. In contrast to reflection by a mirror, a holographic element acts as a diffraction grating to redirect light in an interference pattern. One advantage of a holographic reflector is that light illuminating the surface at angles outside the interference pattern is redirected within the pattern to enhance the brightness of the display at preferred viewing angles. However, because it produces an interference pattern, the reflective holographic element tends to redirect light within a relatively narrow spectral band. It is desired to capture ambient light that is outside the effective spectral band of the holographic element and to redirect the light within the reflection pattern of the holographic element, so as to increase the brightness of the display.

SUMMARY OF THE INVENTION

This invention contemplates a display device that comprises a display panel and a reflective holographic optical element. The display panel comprises at least some regions that have a transparent state, such as the transparent regions of a liquid crystal panel. The reflective holographic optical element is coupled to the back side of the display panel for redirecting light through the transparent regions to create bright areas for the display. In accordance with this invention, the display device further comprises a fluorescent element in combination with the holographic optical element that absorbs light at a first wavelength outside the spectral range of the holographic element and emits light at a second wavelength within the spectral range of the holographic element. In this manner, light that might otherwise not appear in the display is redirected by the holographic element to further enhance the brightness of the display.

BRIEF DESCRIPTION OF THE DRAWINGS

The present invention will be further illustrated with reference to the accompanying drawings wherein.

DETAILED DESCRIPTION OF THE PREFERRED EMBODIMENT

Figure 1:
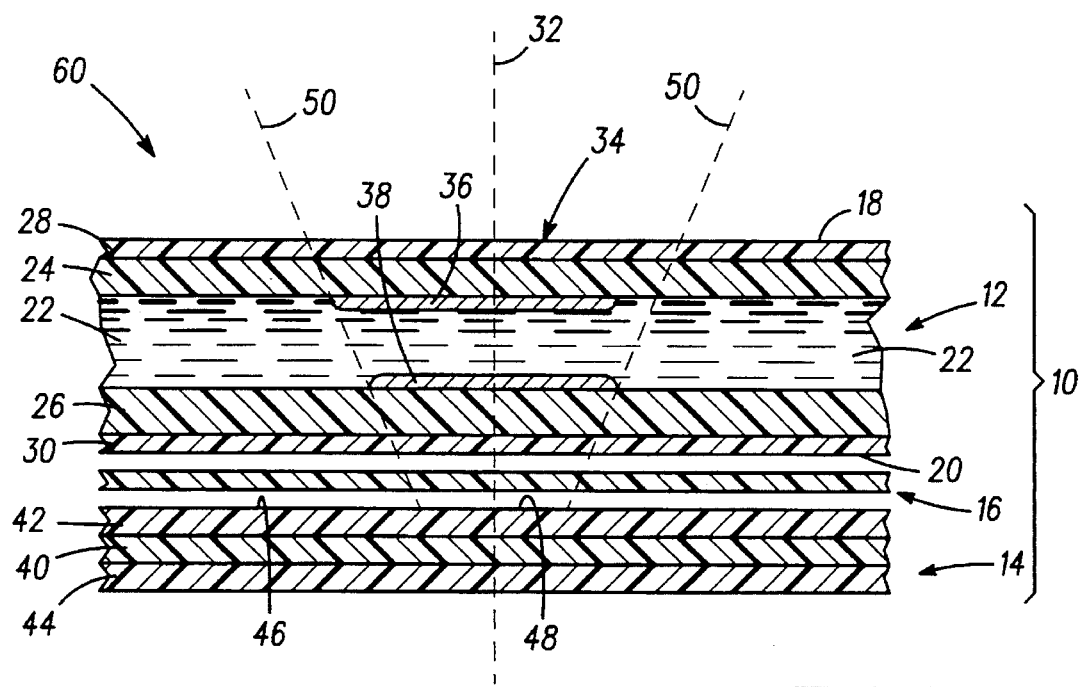
FIG. 1 is a cross-sectional view of a liquid crystal display device comprising a reflective holographic optical element and also comprising a fluorescent panel in accordance with this invention.

In accordance with a preferred embodiment of this invention, referring to FIG. 1, there is depicted a liquid crystal display device 10. Liquid crystal display device 10 comprises a liquid crystal panel 12 and a reflective holographic optical element 14, also referred to as a holographic reflector. In accordance with this invention, liquid crystal device 10 further comprises a fluorescent film 16 interposed between liquid crystal panel 12 and holographic reflector 14.

Liquid crystal panel 12 is of the type that is readily commercially available and is adapted to form a display that is viewed through a front side 18. Panel 12 features a planar, laminar construction and includes a back side 20 opposite front side 18. The panel is composed of a layer 22 formed, for example, of a twisted nematic liquid crystal material, interposed between front and back transparent glass or polymeric plates 24 and 26, respectively. Panel 12 further comprises a front polarizer 28 affixed to the outer surface of plate 24 and a back polarizer 30 affixed to the outer surface of back plate 26. Polarizers 28 and 30 have axis of polarization oriented in perpendicular directions. Liquid crystal panel 24 has an axis 32 that corresponds to a preferred viewing angle. In the depicted embodiment, axis 32 is generally perpendicular to the several elements. However, the axis may be at a nonperpendicular angle to optimize viewing when the device is tilted. The panel includes a region about axis 32, indicated generally at 34, that forms a discrete area for the display and is switchable between a transparent state and an opaque state. By way of an example of a conventional liquid crystal panel, panel 12 comprises transparent electrodes 36 and 38 affixed to the inner surfaces of plates 24 and 26, respectively, adjacent to liquid crystal layer 22. Suitable electrodes are formed of a transparent indium tin oxide material. In the absence of an electrical potential applied to electrodes 36 and 38, light illuminating the panel front side 18 is filtered by front polarizer 28 to admit polarized light to the panel. The polarized light is reoriented by the liquid crystal layer 22 to rotate the polarization parallel to the axis of polarization of the back polarizer 30. In this mode, region 34 is transparent to the polarized light. Alternately, the application of an electrical potential to electrodes 36 and 38 disrupts the liquid crystal layer 22 immediately therebetween so that the polarized light is not reoriented to pass through back polarizer 30. In this mode, region 34 is opaque. For purposes of illustration, this embodiment employs simple electrodes disposed on opposite surfaces. However, the electrodes may be suitably patterned in any configuration to produce a display of desired design. In an alternate example, the electrodes affixed to the front plate are arranged in rows, and electrodes on the back plate are arranged in columns whereupon pixels for the display are defined at intersections where a row crosses a column.

Figure 2:
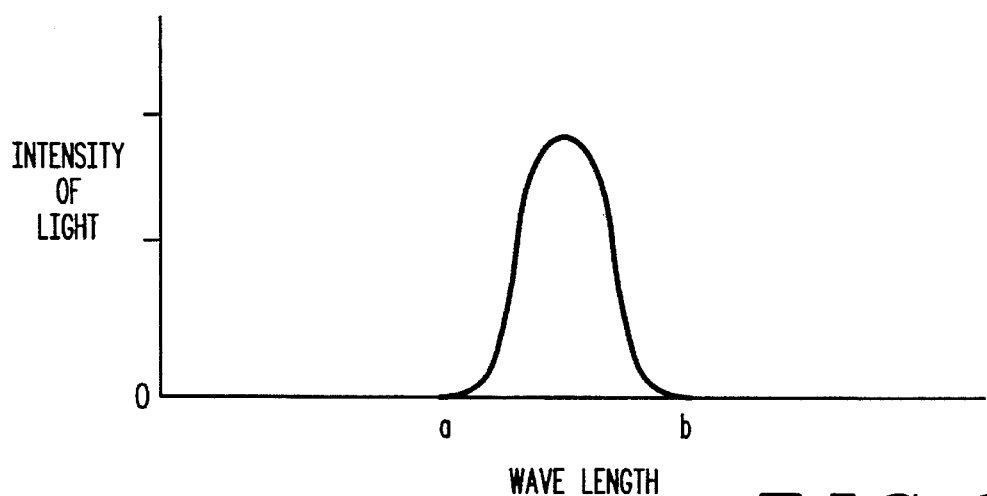
FIG. 2 is a graph showing schematically reflected light as a function of wavelength for a holographic optical element utilized in this invention.

A preferred reflective holographic element 14 is a volume reflective holographic optical element described in U.S. patent application Ser. No. 143,600, filed 1993, attorney docket number CM00756F/I, and assigned to the present assignee, incorporated herein by reference. Although referred to as a reflector, it is helpful in understanding the present invention to appreciate that the holographic element does not reflect light by bouncing rays like a mirror, but rather produces an interference pattern, which has the appearance of a reflection pattern, but is limited to light of predetermined wavelengths. Volume holographic optical elements are commercially available from the Polaroid Corporation and include a layer 40 containing a photopolymer having the trade designation "DMP-128" that may be suitably exposed and developed to produce a desired reflection pattern. Layer 40 is interposed between front and back transparent plates 42 and 44, respectively. Front surface 46 of holographic reflector 14 faces back side 20 of liquid crystal panel 12. In a preferred embodiment, holographic reflector 14 has a uniform appearance when viewed toward front face 46, such as produced by a continuum of substantially uniform reflection sites, of which site 48 is representative. Light illuminating site 48 is redirected in a conical reflection pattern indicated by lines 50. In forming the holographic element 14, the photopolymer layer 40 is exposed to laser light and developed to form varying indices of refraction that are effective to redirect light in an interference pattern, which is the reflection pattern indicated by lines 50. However, holographic element 14 is effective to redirect light only within a limited spectral band. FIG. 2 is a graph showing schematically the intensity of light redirected by a typical reflective holographic element as a function of wavelength. As can be seen, the interference patterns is limited to light having a wavelength within a band between a and b. The band is determined by the wavelength of laser light utilized in forming the holographic element. Nevertheless, light from a broad spectrum source, such as an incandescent lamp or a fluorescent light used for ambient lighting, includes light having wavelengths outside the effective spectral band of the holographic reflector.

In accordance with this invention, a fluorescent film 16, also referred to as a fluorescent optical element, is formed of a transparent polymeric film containing a fluorescent compound, referred to as a phosphor, dispersed in a transparent polymeric matrix. The fluorescent compound absorbs light at a first wavelength and re-emits the light at a second wavelength distinct from the first wavelength and within the spectral band of holographic reflector 14. Fluorescent film 16 is interposed between liquid crystal panel 12 and reflective holographic element 14. In FIG. 1, panel 12, film 16 and reflector 14 are depicted as spaced apart for purposes of illustration, but are juxtaposed during assembly to provide multilayer structure without intermediate gaps. Alternately, film 16 is adhesively bonded to back side 20 of panel 12 and to front side 46 of holographic element 14 to produce an integral component. Also, film 16 may be affixed directly to photopolymer layer 40, thereby eliminating layer 42, while providing protection for the photographic layer, as well as fluorescent enhancement in accordance with this invention.

By way of a specific example, a suitable fluorescent phosphor is commercially available from the Osram Sylvania, Inc., Pennsylvania, under the trade designation "Sylvania Type 1260 Phosphor" and contains zinc sulfide compound activated by copper and aluminum additions. The phosphor exhibits a peak absorption at about 450 nanometers and emits light between 530 and 545 nanometers. The decay rate is between about 10 microseconds and 1 millisecond. The film is intended for use with a reflective holographic element having an interference band between about 520 to 600 nanometers.

During use, front side 18 is illuminated by ambient light, including at region 34. With region 34 in the transparent state, light is filtered by front polarizer 28 and transmitted through liquid crystal panel 12 to irradiate holographic reflector 14. Light within the spectral band of reflector 14 is redirected within the reflection pattern indicated by lines 50 and is retransmitted through liquid crystal panel 12 to create a bright pixel for the display. One advantage of holographic reflector 14 is that light illuminating region 48 at angles outside the reflection pattern, such as indicated by arrow 60, is redirected within the reflection pattern to enhance the brightness of the display. A portion of the ambient light that is transmitted through liquid crystal panel 12 includes light having a wavelength that is absorbed by the fluorescent compound of element 16. This absorption stimulates the fluorescent compound to emit light within the spectral band of reflector 14. A portion of the fluorescent light is emitted directly toward back side 20 and is transmitted through the panel, adding to the brightness of the display. Of greater significance, a portion of the fluorescent light is directed toward holographic reflector 14 and, being within the spectral band of the holographic reflector, is then redirected within the reflection pattern, thereby further increasing the effective brightness of the display.

Therefore, this invention provides enhanced brightness for a display produced by a device having a reflective holographic optical element using ambient illumination. This is accomplished by means of a fluorescent element interposed between the display panel and the reflective holographic element and contains a fluorescent compound for emitting fluorescent light within the effective range of the holographic element. In an alternate embodiment, the fluorescent compound may be dispersed within the holographic reflector, for example, within the photographic layer, to eliminate the need for an additional element within the device. While this invention has been described with reference to a particular fluorescent compound in combination with a holographic element, the holographic element may be readily adapted for use with other fluorescent compounds, provided that the emission band of the compound is within the effective interference band of the reflector. Also, while the compound in the described embodiment absorbed and re-emitted light almost concurrently, as indicated by the decay rate less than a second, a fluorescent compound may be utilized having a significant delay before re-emission, to augment lighting of the display under low ambient light conditions, following absorption under bright condition.

In the described embodiment, the display device comprises a liquid crystal panel, a holographic reflector and a fluorescent element, which may be either juxtaposed discrete elements or bonded into an integral component. In selecting the several elements, it is desired to employ adjacent elements having indices of refraction that are comparable to avoid internal reflection of light at the interface between. Similarly, in bonding the elements into an integral structure, it is desired to utilize an adhesive having a comparable index of refraction to the adjacent layers. Additional elements may be included in order to further enhance the intensity of reflected light. For example, a diffuse reflector may be included facing the back side of the holographic reflector opposite the liquid crystal panel to diffusely reflect light that traverses the holographic reflector and thereby further increase the brightness of the display, as well as adding light for viewing that is outside the spectral band of the holographic element. In still another embodiment of this invention, the display device may include the holographic element that is a transflector and also an internal light source arranged to illuminate the back side of the holographic reflector. The transflector acts as a reflective element for ambient light illumination. In this mode, the fluorescent element provides increased light within the reflection pattern to increase the brightness. Alternately, the internal light source may be actuated to provide back lighting for the display.

This invention has been described with reference to a preferred embodiment that is a liquid crystal display device. However, the invention may be readily adapted to enhance ambient light illumination other display devices that employ display panels having transparent regions and produce bright areas for the display by reflected light utilizing a holographic element.

While this invention has been described in terms of certain embodiments thereof, it is not intended that it be limited to the above description, but rather only to the extent set forth in the claims that follow.

The embodiments of the invention in which an exclusive property is claimed are defined as follows:

What is claimed is:

1. A display device illuminatable by diffuse ambient light and comprising a display panel having a front side for viewing a display and a back side opposite the front side, said display panel comprising a transparent region, a reflective holographic optical element effective for redirecting light having a wavelength within a predetermined spectral band in a reflection pattern and optically coupled to the display panel for receiving light transmitted through the panel and for directing light in the reflection pattern toward the back side of the display panel, whereupon light redirected toward a transparent region of the display panel is transmitted through the display panel to form a bright area for the display, and a fluorescence element containing a fluorescent compound that absorbs light having a wavelength outside the predetermined spectral band and emits fluorescent light having a wavelength within the predetermined spectral band and optically coupled to the display panel and the reflective holographic optical element to receive light transmitted through the display panel and to emit fluorescent light toward the reflective holographic optical element, whereupon fluorescent light received by the reflective holographic optical element is redirected within the reflection pattern to enhance brightness of the bright area for the display.

2. The display device in accordance with claim 1 wherein the fluorescence element is a polymeric film containing the fluorescent compound and is interposed between the back side of the display panel and the reflective holographic optical element.

3. A liquid crystal display device illuminatable by diffuse ambient lighting and adapted for forming a display that includes a bright area, said liquid crystal display device comprising a liquid crystal panel having a front side for viewing a display and a back side opposite the front side, said display panel comprising a region that is switchable between a transparent state for transmitting polarized light and an opaque state, a reflective holographic optical element having a front face facing the back side of the liquid crystal panel for receiving polarized light transmitted through the liquid crystal panel and for redirecting light having a wavelength within a predetermined spectral band in a reflection pattern to illuminate said back side, whereupon light redirected toward a transparent region of the liquid crystal panel is transmitted through the liquid crystal panel to form a bright area for the display, and a fluorescent film interposed between the liquid crystal panel and the reflective holographic optical element and effective to absorb light transmitted through the liquid crystal panel and having a wavelength outside the predetermined spectral band and to emit fluorescent light having a wavelength within the predetermined spectral band, whereupon fluorescent light emitted by the fluorescent film is received by the reflective holographic element and is redirected in the reflection pattern toward the liquid crystal panel to enhance brightness of the bright area.

4. A liquid crystal display device in accordance with claim 3 wherein the fluorescent film is composed of a fluorescent compound dispersed in a transparent polymeric matrix.

5. A liquid crystal display device in accordance with claim 3 wherein the fluorescent film is attached to the back side of the liquid crystal panel and to the reflective holographic optical element to form an integral component.

\* \* \* \* \*